United States Patent
Liu et al.

(10) Patent No.: US 9,581,719 B2
(45) Date of Patent: Feb. 28, 2017

(54) APPARATUS AND METHOD FOR OIL-BASED MUD FORMATION IMAGING USING RESONATORS

(71) Applicants: Yue Liu, Beijing (CN); Qingjie Bai, Beijing (CN); Qihui Zhao, Beijing (CN); Yuzhou Lu, Beijing (CN); Tao Huang, Beijing (CN); Zhong Wang, Houston, TX (US); Suming Wu, Houston, TX (US); Ce Liu, Houston, TX (US)

(72) Inventors: Yue Liu, Beijing (CN); Qingjie Bai, Beijing (CN); Qihui Zhao, Beijing (CN); Yuzhou Lu, Beijing (CN); Tao Huang, Beijing (CN); Zhong Wang, Houston, TX (US); Suming Wu, Houston, TX (US); Ce Liu, Houston, TX (US)

(73) Assignee: Bitswave, Inc., Sugar Land, TX (US)

( * ) Notice: Subject to any disclaimer, the term of this patent is extended or adjusted under 35 U.S.C. 154(b) by 730 days.

(21) Appl. No.: 13/936,013

(22) Filed: Jul. 5, 2013

(65) Prior Publication Data
US 2015/0012216 A1 Jan. 8, 2015

(51) Int. Cl.
*G01V 3/24* (2006.01)
*G01V 3/02* (2006.01)
*G01V 3/20* (2006.01)
*G01V 3/30* (2006.01)
*G01V 3/10* (2006.01)

(52) U.S. Cl.
CPC ............. *G01V 3/30* (2013.01); *G01V 3/101* (2013.01)

(58) Field of Classification Search
CPC ...................................................... G01V 3/24
USPC ...................................................... 324/367
See application file for complete search history.

(56) References Cited

U.S. PATENT DOCUMENTS

2008/0068025 A1* 3/2008 Gold et al. ............. 324/367
2012/0068711 A1* 3/2012 Forgang ................. 324/324

* cited by examiner

*Primary Examiner* — Bot Ledynh
(74) *Attorney, Agent, or Firm* — Lai, Corsini & Lapus, LLC; Theodore Lapus

(57) ABSTRACT

An oil-based mud formation imaging tool for measuring electrical properties of surrounding formation includes at least one base plate, a first port and a second port deployed on the base plate, surface conductors covering both sides of the base plate, and inside conductors deployed in the first port and the second ports and with gaps from the edges of the first and second ports. The first port is fed with electromagnetic signals by a waveguide and a coupling is formed between the imaging tool and the surrounding formation accordingly. Resonance signals are induced at the second port to be used to compute corresponding formation resistivity and dielectric constant. A corresponding imaging method is also provided.

10 Claims, 14 Drawing Sheets

APPARATUS AND METHOD FOR OIL-BASED MUD FORMATION IMAGING USING RESONATORS

FIELD OF THE INVENTION

The present invention relates generally to the field of electrical resistivity well logging. More particularly, the invention relates to an apparatus and a method for making images of a subterranean formation through measuring dielectric constant and resistivity of formation using resonators.

BACKGROUND OF THE INVENTION

The use of electrical measurements for gathering of downhole information, such as logging while drilling ("LWD"), measurement while drilling ("MWD"), and wireline logging system, is well known in the oil industry. Such technology has been utilized to obtain a great quantity of geologic information regarding conditions and parameters encountered downhole. It is important to determine geologic information with a high degree of accuracy for drilling efficiency. For example, as known in the prior art, the formation containing hydrocarbon (such as crude oil or gas) usually has higher resistivity than the formation containing water. It is preferable to keep the borehole in the pay zone (the formation with hydrocarbons) as much as possible so as to maximize the recovery.

Geologic information typically includes formation resistivity (or conductivity; the terms "resistivity" and "conductivity", though reciprocal, are often used interchangeably in the art), dielectric constant, data relating to the configuration of the borehole, etc. Borehole images could help geologists and geophysicists define the structural position of reservoirs and characterize features, such as fractures and folds. However, the nonconductive environment prohibits the use of conventional micro-resistivity imaging devices. In such circumstance, either oil-based mud resistivity imaging devices have to be used or the mud must be changed at great expense and inconvenience to the operator. Therefore, the use of nonconductive (e.g. oil-based and synthetic) mud in drilling process, which can be utilized to reduce drilling risks and improve drilling efficiency, has become more and more popular nowadays.

FIGS. 1A and 1B show a side view and a front view of an oil-based mud resistivity imaging device making four-terminal resistivity measurements as known in prior art. The sensor pad 100 can be deployed against the borehole wall 120 for measuring the resistivity of formation 102 near the borehole. The sensor pad 100 includes two current electrodes 104 and 106 and several voltage electrodes 108 and 110. A standoff 112 would possibly be situated between the formation 102 and the sensor pad 100. The standoff 112 can be filled with nonconductive fluid, such as an oil-based mud or mix of it and other materials form the borehole, present in the borehole whiling drilling.

In operation, the current electrodes 104 and 106 are used to conduct electric current (I) through the formation 102. The pair of voltage electrodes 108 and 110 is used to measure the voltage difference (dV) between them. According to the Ohm's Law, the resistivity of the small interval between the pair of voltage electrodes 108 and 110 of the formation 102 can be computed as follows, $$Rt = k\frac{dV}{I} \tag{1}$$

where k is a geometrical factor.

However, although the oil-based mud resistivity imaging devices have been used commercially, the imaging quality still strongly depends on the borehole environment (e.g. mud film or mud cake thickness, rugosity of the borehole wall etc.). The rugosity of the borehole wall would cause tilt of the sensor pad. As a result, the measurement of the voltage difference between the pair of voltage electrodes would be affected.

Furthermore, the capacitive coupling between the current and voltage electrodes and the formation would be significant when the oil-based mud resistivity imaging device is operated at relatively low frequency (e.g., a few kHz). When the oil-based mud resistivity imaging device is excited at low frequency, most of voltage drops would occur in the mud film, instead of the formation, due to limited current being able to penetrate the very resistive oil film to reach the formation.

Also, in the case where the formation water is relatively fresh or variable, the resistivity-based methods at a relatively low frequency are difficult because of the small and uncertain contrast between hydrocarbons and water. Should being under this situation, dielectric properties can provide an alternative means of evaluating water distribution since the dielectric constant of water differs nearly an order of magnitude from the dielectric constants of other formation constituents. In addition, dielectric permittivity is also of interest in evaluating zones where the water salinity is unknown, as might be the case in secondary recovery projects where water injection has altered the formation water.

As described above, a need exists for an improved apparatus and method for an improved excitation for oil-based mud resistivity imaging.

A further need exists for an improved apparatus and method for minimizing the tilt effect and enhancing transmission and reception.

A further need exists for an improved apparatus and method for making both formation resistivity and dielectric permittivity measurements.

The present embodiments of the apparatus and the method meet these needs, and improve on the technology.

SUMMARY OF THE INVENTION

Accordingly, there are disclosed herein methods and apparatus using resonators for formation imaging in oil based mud. This section provides a general summary of the disclosure, and is not a comprehensive disclosure of its full scope or its entire feature.

In one preferred embodiment, an imaging system for measuring electrical properties of surrounding formation includes at least one pad, at least one resonator deployed on the pad, an electrical circuit coupled with the resonator to process data derived on the resonator, at least one arm to hold the pad, and a pusher to extract or stretch the arm.

In some embodiments, the electrical circuit is deployed in or on a mandrel.

In some embodiments, the electrical circuit contains a telemetry module to sample, digitize, or transmit the data to ground.

In some embodiments, wherein the resonator can be a ring resonator.

In other embodiments, the pad has a recession region to be put with the resonator.

In another preferred embodiments, an oil-based mud formation imaging tool for measuring electrical properties of surrounding formation includes at least one base plate, a first port and a second port deployed on the base plate, surface conductors covering both sides of the base plate, and inside conductors deployed in the first port and the second ports and with gaps from the edges of the first and second ports.

In some embodiments, the first port is fed with electromagnetic signals by a waveguide and cause a coupling to be formed between the imaging tool and the surrounding formation. The resonance signals are induced at the second port accordingly and used to compute corresponding formation resistivity and dielectric constant.

In some embodiments, the inside conductor is the center wire of the waveguide.

In some embodiments, the surface conductor is a ring conductor deployed on the surface of the base plate.

In some embodiments, the exterior surface of the waveguide is grounded by contacting with the surface conductor covering one side of the base plate.

In some embodiments, the base plate is made of dielectric materials.

In some embodiments, the dielectric materials have small dielectric loss.

In other embodiments, the waveguide is a coaxial cable.

In other embodiments, the electromagnetic signals have sweeping frequency.

In other embodiments, the second port is coupled with a circuit to process induced resonance signals.

In other embodiments, the gap between the inside conductor and the edge of the port creates an impedance in between, which varies with electrical properties of surrounding formation.

In still another preferred embodiment, an oil-based mud formation imaging method for measuring electrical properties of surrounding formation includes deploying at least one resonator with a first port and a second port into a borehole, applying electromagnetic signals with sweeping frequency to the first port, inducing resonance signals at the second port, extracting formation parameters from the induced resonance signals, and deriving corresponding formation resistivity and dielectric constant according to the extracted formation parameters.

In some embodiments, the oil-based mud formation imaging method further includes generating borehole images based on the derived formation resistivity and dielectric constant.

In some embodiments, the formation parameter is a S21 parameter, a Q-factor, or a resonant frequency, or a combination of two or three of them.

In other embodiments, deriving corresponding formation resistivity and dielectric constant according to the extracted formation parameter includes looking up a pre-built table.

In some embodiments, the pre-built table includes any two of the three parameters: resonant frequency, S21 parameter, and Q-factor, and built through forward modeling.

BRIEF DESCRIPTION OF THE DRAWINGS

The drawings described herein are for illustrating purposes only of selected embodiments and not all possible implementation and are not intended to limit the scope of the present disclosure.

The detailed description will be better understood in conjunction with the accompanying drawings as follows.

DETAILED DESCRIPTION OF THE EMBODIMENTS

Figures 1A, 1B:
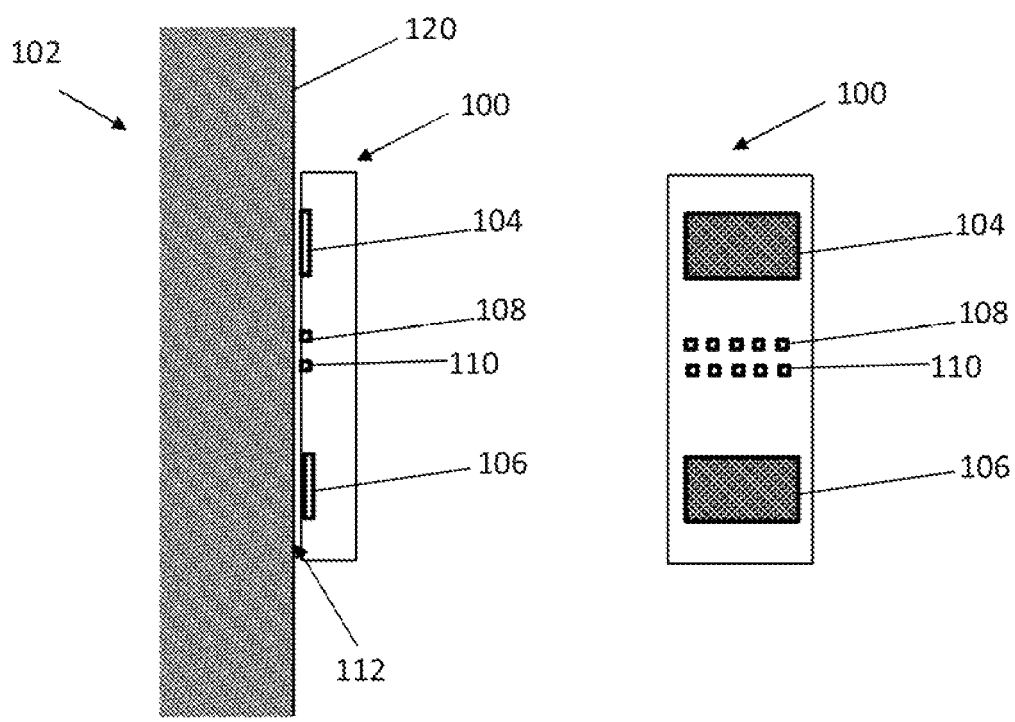
FIGS. 1A and 1B show a side view and a front view of an oil-based mud resistivity imaging device making four-terminal resistivity measurements
Figure 2:
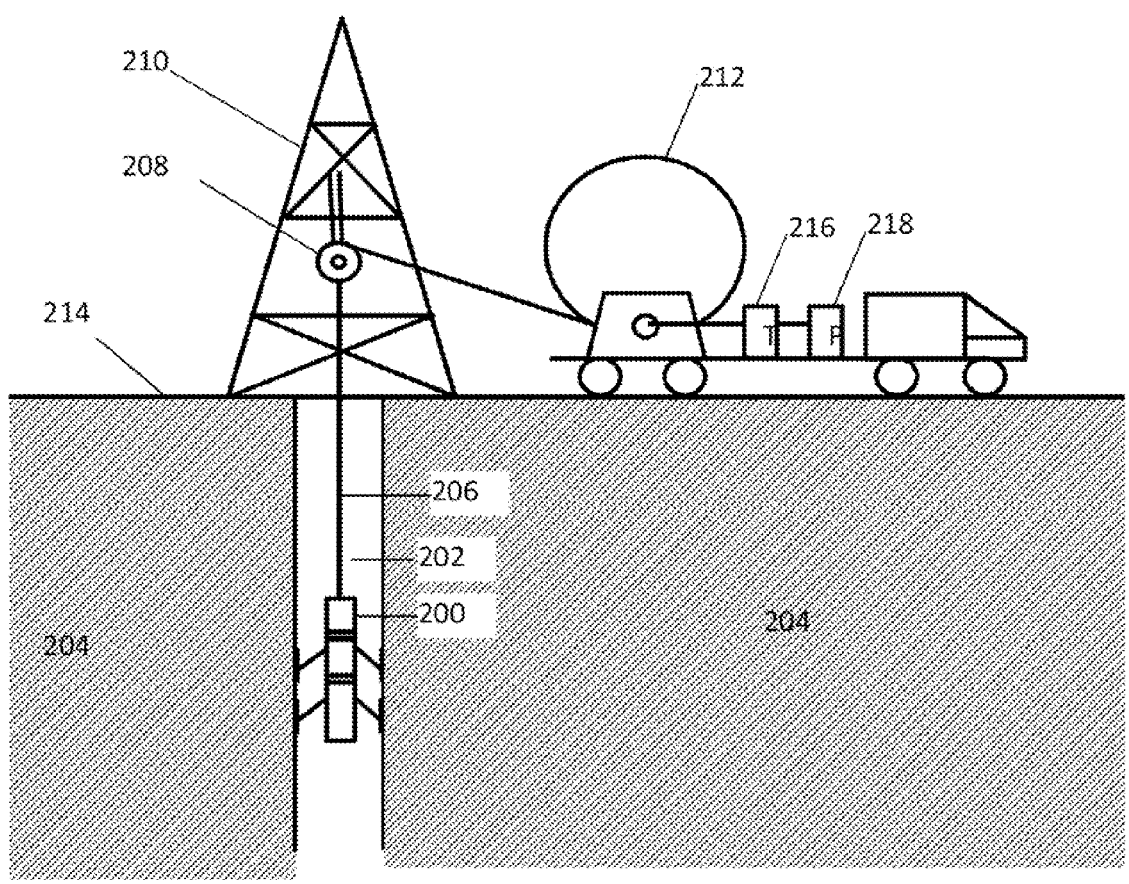
FIG. 2 shows an illustration of an imaging system suspended in a borehole penetrating subterranean formation according to some embodiments.

FIG. 2 shows an illustration of an imaging system 200 suspended in a borehole 202 penetrating subterranean formation 204 according to some embodiments of the present invention. The image system 200 can be carried by a cable 206 passing over a sheave 208 mounted on a drilling rig 210 and extending from above a surface 214 down to the borehole 202. The imaging system 200 can be raised and lower by a draw work 212. An electronic module 216 above the surface 214 can communicate with the imaging tool system 200 positioned beneath the surface 214.

In some embodiments, the electronic module 216 can be coupled with a data processor 218, e.g., a computer, to perform data analysis in a real-time basis.

In some embodiments, the electronic module 216 can be coupled with a storage device to record data received from the imaging system 200. The stored data can be sent to a remote processing center or be processed locally later.

In some embodiments, the cable 206 can usually include one or more stress members and conductors to provide both mechanical support and electronic communication.

Figure 3A:
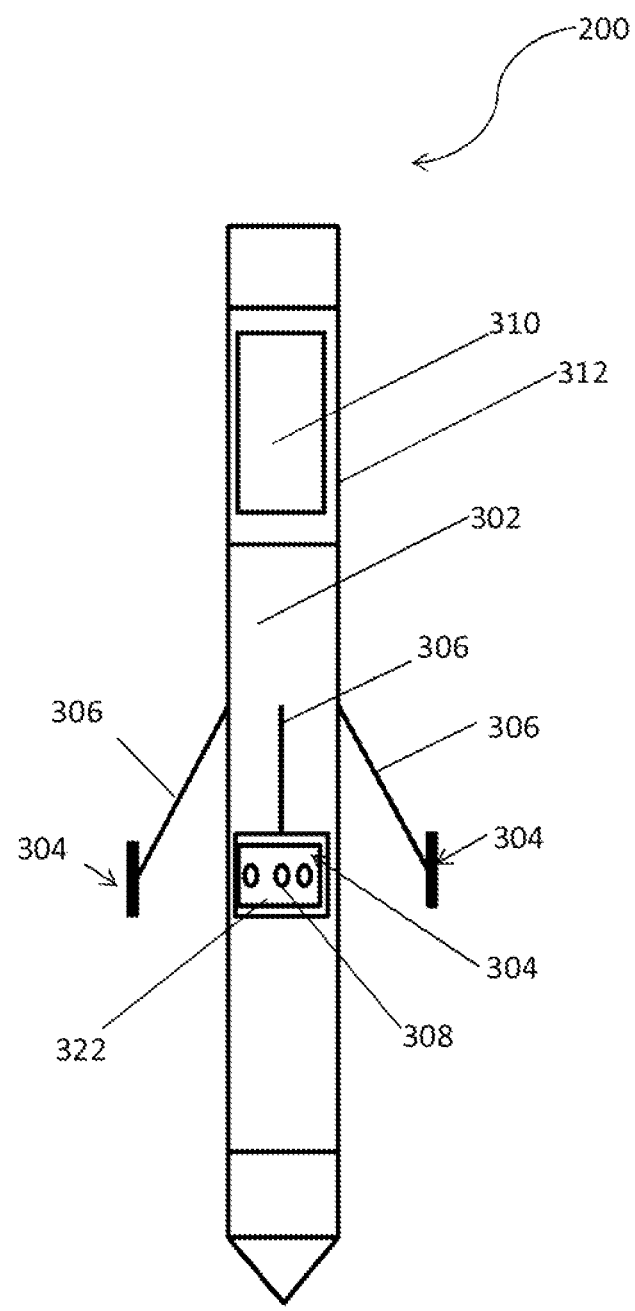
FIG. 3A illustrates a perspective view of the imaging system in FIG. 2 according to some embodiments.

FIG. 3A illustrates a perspective view of the imaging system 200 as shown in the FIG. 2 according to some embodiments of the present invention. The imaging system 200 can include at least one pad 304, at least one resonator 308 deployed on the pad 304, and an electrical circuit 310 coupled with the resonator 308 to process data derived on the resonator 308. An arm 306 can hold the pad 304 and be extracted or stretched by a pusher 302.

In some embodiments, the electrical circuit 310 can be deployed in or on a mandrel 312.

In some embodiments, the electrical circuit 310 can contain a telemetry module to sample, digitize, or transmit data to the electronics module 216 as shown in the FIG. 2.

In some embodiments, the resonator 308 can be a ring resonator.

Figure 3B:
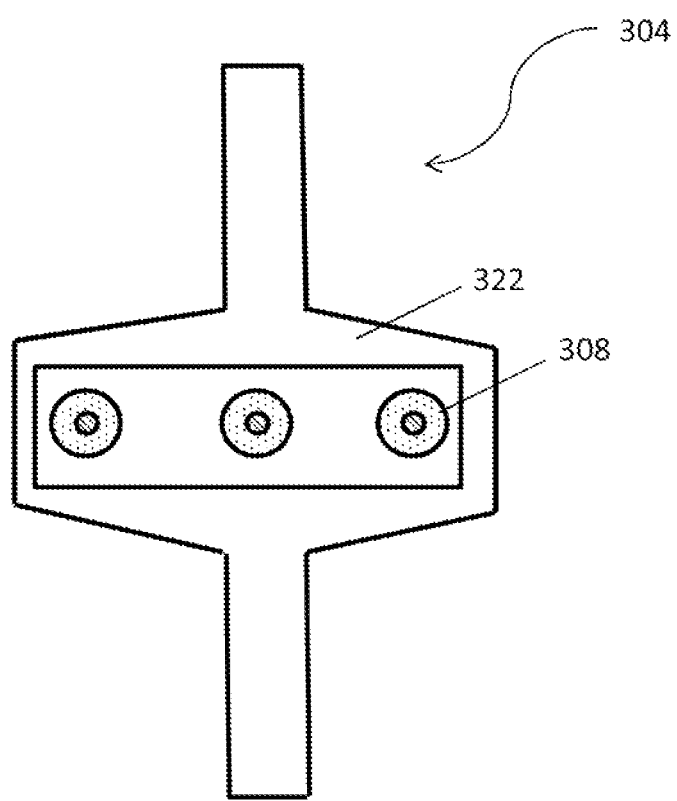
FIG. 3B illustrates an enlarged view of the pad with three resonators shown in FIG. 3A.

FIG. 3B illustrates an enlarged view of the pad 304 with three resonators 308 shown in the FIG. 3A according to some embodiments of the present invention. The resonators 308 can be deployed in a recession region 322 of the pad 304.

Figure 4:
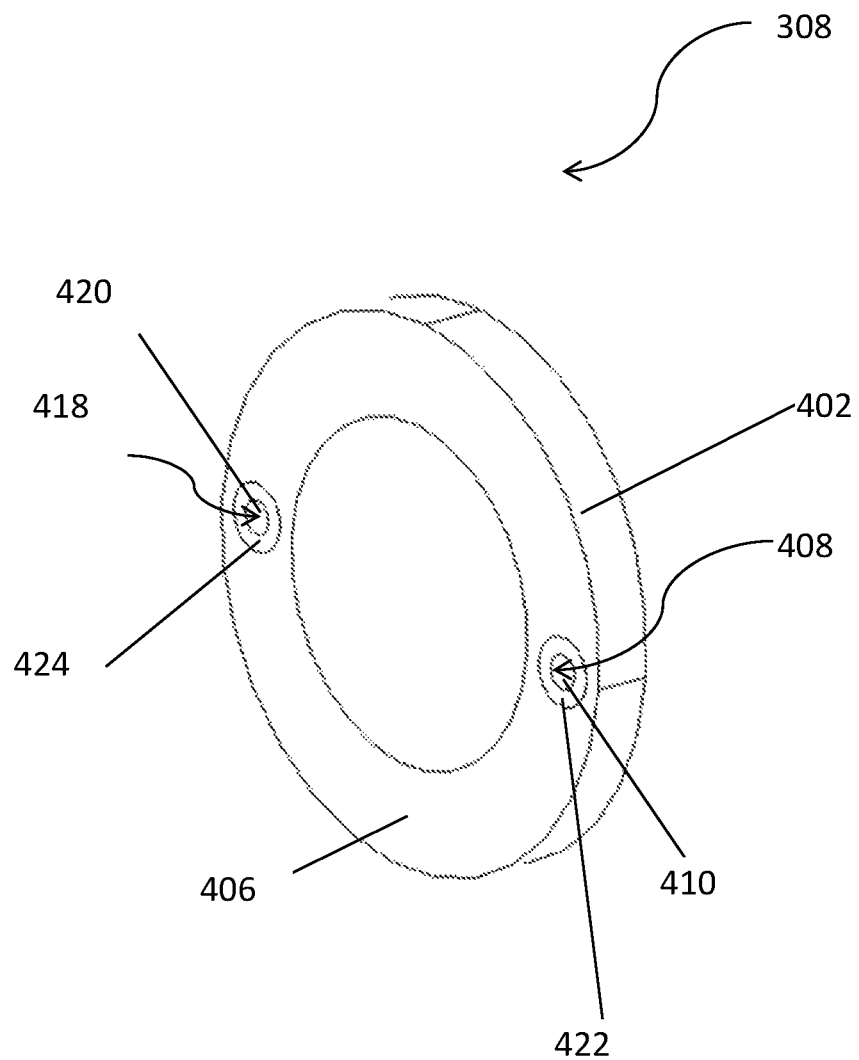
FIG. 4 shows a schematic view of the resonator.

FIG. 4 shows a schematic view of the resonator 308 according to some embodiments of the present invention. The resonator 308 can include a base plate 402, first and second ports 408 and 418 deployed on the base plate 402, surface conductors 406 and 412 (hidden in this) covering both sides of the base plate 402, and inside conductors 410 and 420 deployed in the first port 408 and the second port 418 and with gaps 422 and 424 from the edges of the first port 408 and the second port 418. The first port 408 can be fed with electromagnetic signals by at least one waveguide (not shown in the FIG. 4) and cause coupling effect between the resonator 308 and surrounding formation. Resonance signals then can be induced at the second port 418 and formation resistivity and dielectric constant can be computed according to formation parameters extracted from the resonance signals.

In some embodiments, the inside conductors 410 and 420 can be the center wires of the waveguides.

In some embodiments, the surface conductors 406 and 412 can be ring conductors deployed on the surface of the base plate 402.

In some embodiments, the exterior surface of the waveguide can be grounded by contacting with the surface conductor 412.

In some embodiments, the base plate 402 can be made of dielectric materials, e.g., FR4, preferably the dielectric materials with small dielectric loss.

In some embodiments, the waveguide can be a coaxial cable.

In some embodiments, the electromagnetic signals can have sweeping frequency.

In some embodiments, the second port 418 can be coupled with a circuit to process resonance signals.

The gap between the inside conductors 410 and 420 and the edges of the ports 408 and 418 can create impedances in between. The impedance would vary with electrical properties of the medium surrounding the resonator 308. Since the variation of the impedance would lead to variation of corresponding resonant frequency and quality factor of the resonator 308, the electrical properties of surrounding formation, i.e., formation resistivity and dielectric constant, can be obtained by measuring the resonant frequency and quality factor of the resonator 308.

In some embodiments, different resonators can have different base plates with different electrical properties or thickness, dimension of the surface conductors, or widths of the gaps to avoid overlap of frequency sweeping between resonators.

The resonator usually operates at a frequency ranging from a few hundred MHz to GHz at which the dielectric permittivity of medium dominates, and therefore the impact of oil film can be reduced comparing to the resistivity-based method operating at relatively low frequency. Furthermore, the pad with resonators can be much smaller than the pad with electrodes, and therefore the impact of pad tilt due to the rugosity of the borehole can be mitigated.

Figure 5:
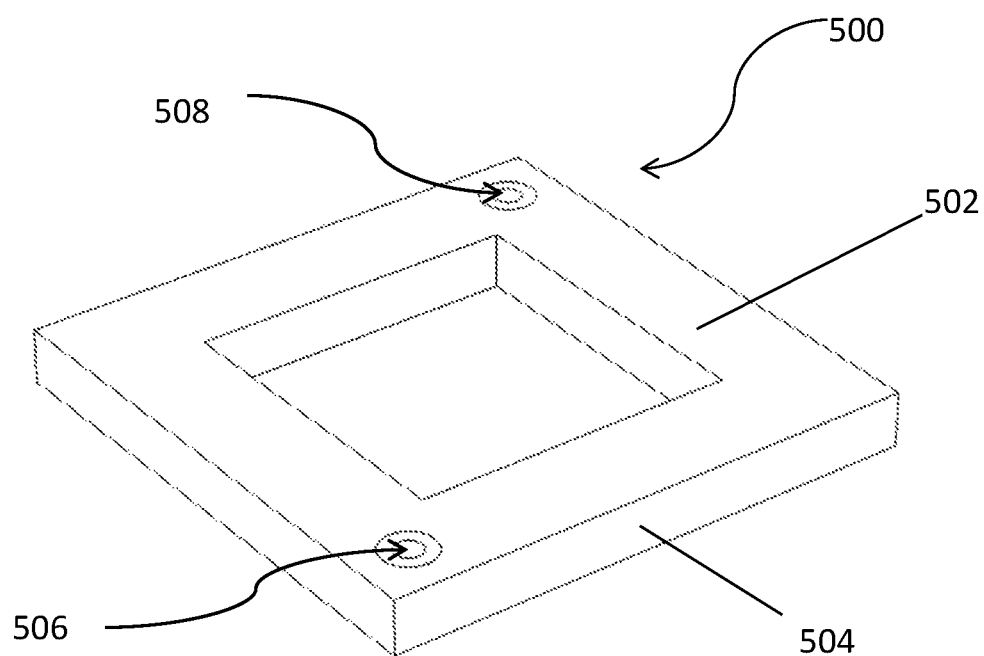
FIG. 5 shows a schematic view of a resonator with square shape.

FIG. 5 shows a schematic view of a resonator 500 with square shape according to some embodiments of the present invention. Similar to the resonator 308 with ring shape shown in the FIG. 4, the square-shaped resonator 500 can include a base plate 504, a first port 506, a second port 508, surface conductors 502 and 510 (hidden in this view) covering both sides of the base plate 504, and inside conductors deployed in the first port 506 and the second port 508 and with gaps from the edges of the first port 506 and the second port 508. The working theory of the square-shaped resonator 500 is similar to that of the resonator 308 with ring shape.

The present invention is in no way limited to any particular number or shape of the resonator.

Figure 6:
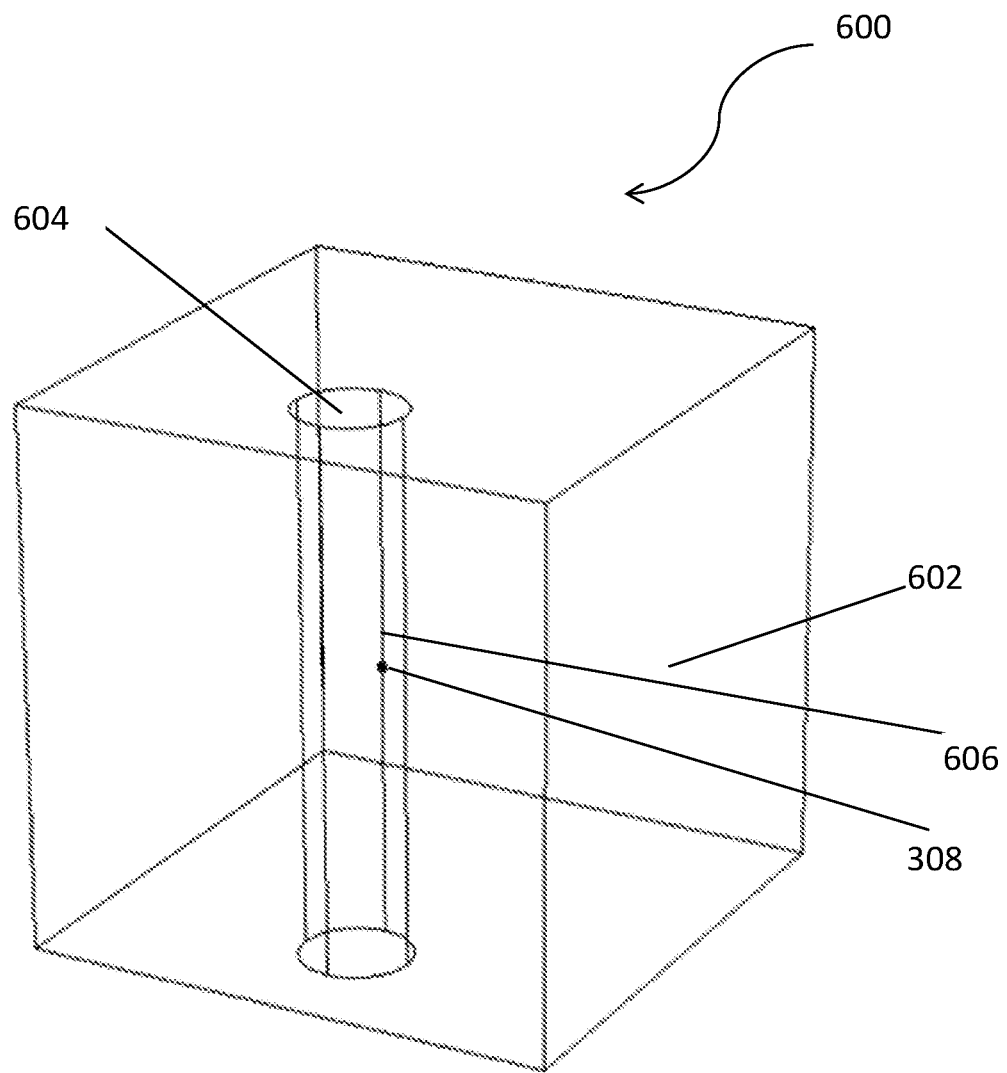
FIG. 6 illustrates a model used for demonstrating the sensitivity of some embodiments of the present invention to the formation electrical properties (dielectric constants and resistivity).

FIG. 6 illustrates an exemplary 3-D model 600 used for demonstrating the sensitivity of some embodiments of the present invention to electrical and dielectric properties of formation. FIGS. 7-10 show simulation results of the model 600 provided in FIG. 6 according to some embodiments of the present invention. Referring to FIG. 6, the model 600 can contain a 3D cube 602 with a cylinder 604 penetrating through. The cylinder 604 can simulate a borehole filled with oil mud and have a resistivity of 1M ohm*m and a dielectric constant of 5. The cube 602 can simulate surrounding formation with varying resistivities and dielectric constants. The resonator 308 can be applied against a borehole wall 606. In this model, the resonator 308 has an external diameter of 16 mm, a width of 3 mm, and a thickness of 2 mm, and is 1 mm away from the borehole wall 606. The dimension of the resonator 308 to be put in the model 600 is very small, so that it can be close to the borehole wall 606 as much as possible.

Figure 7:
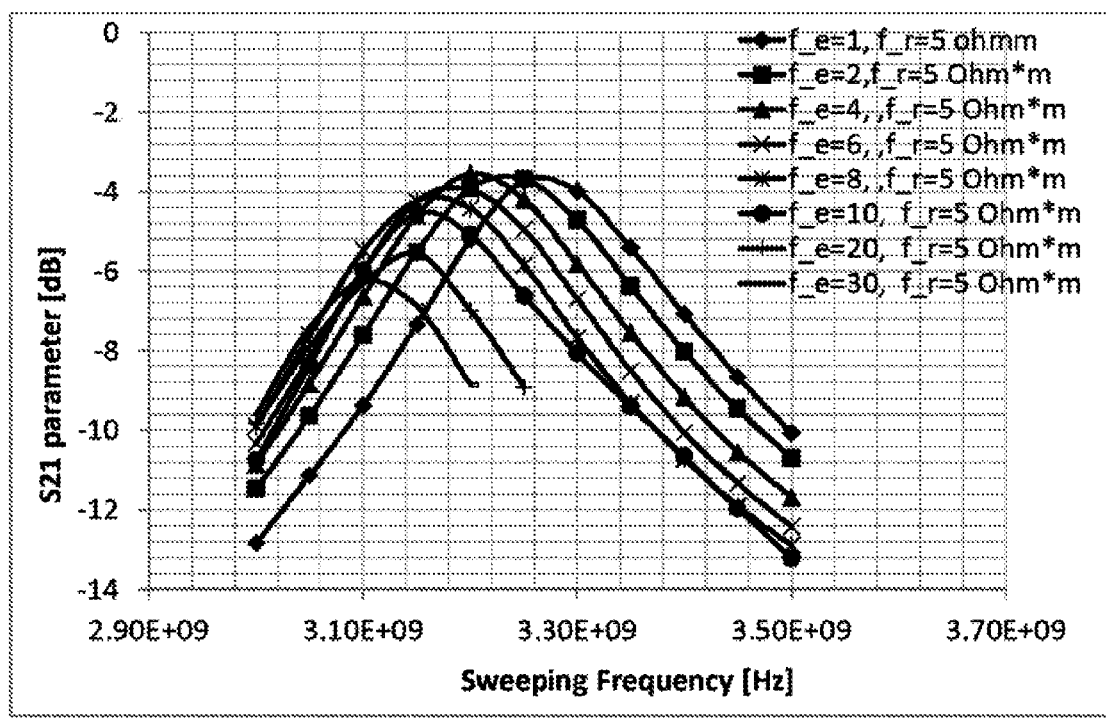
FIG. 7 illustrates a data diagram of S21 parameter versus sweeping frequency with different formation dielectric constants.

FIG. 7 illustrates a data diagram of S21 parameter versus sweeping frequency with different formation dielectric constants (denoted as f_e in the FIG. 7) ranging from 1 to 30 and constant formation resistivity (denoted as f_r in the FIG. 7) of 5 ohm*m. It can be observed that the S21 parameters in dB at one port vary with sweeping frequencies at the other port. The S21 parameter can reach a maximum value at a certain frequency, i.e., resonant frequency. The resonant frequency shifts toward left with increase of dielectric constant of formation.

Figure 8A:
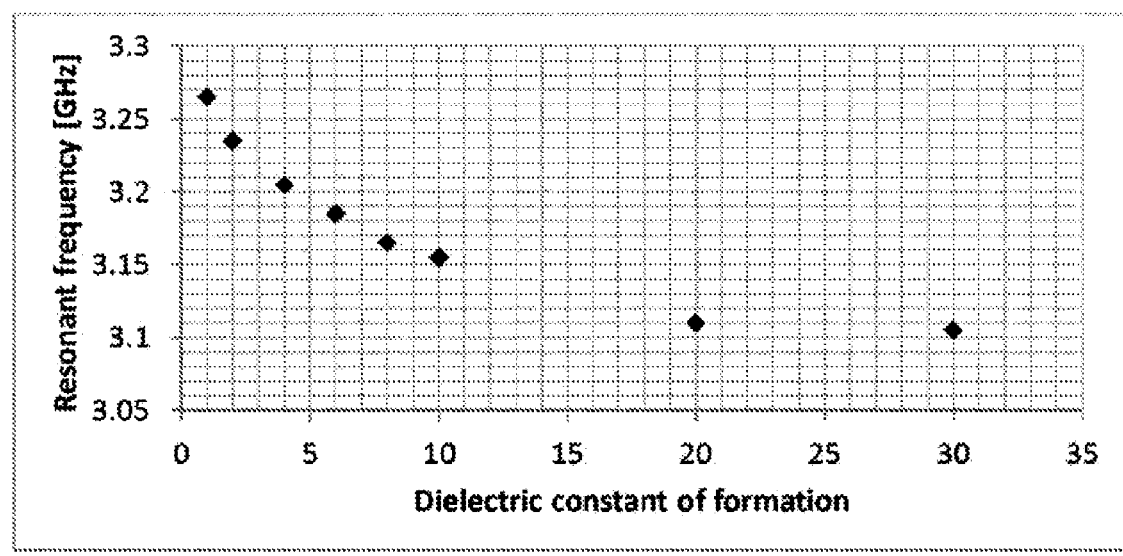
FIG. 8A illustrates a data diagram of resonant frequency versus dielectric constant of formation.
Figure 8B:
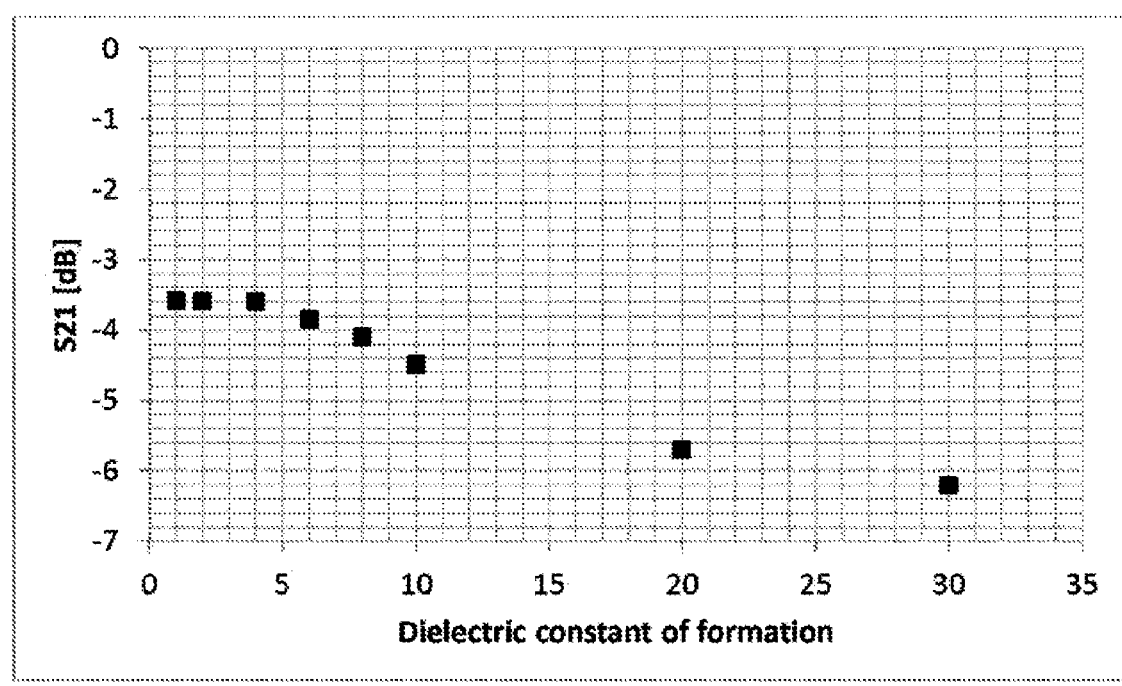
FIG. 8B illustrates a data diagram of S21 parameter versus dielectric constant of formation.

The changing of S21 parameter and resonant frequency with increase of dielectric constant can be better shown in FIGS. 8A and 8B. FIG. 8A illustrates a data diagram of resonant frequency versus dielectric constant of formation and FIG. 8B illustrates a data diagram of S21 parameter versus dielectric constant of formation. It can be seen that both resonant frequency and S21 parameter decrease monotonically with increase of the dielectric constant of formation. In the model 600, the resonant frequency decreases nearly exponentially with dielectric constant of formation. However, the S21 parameter is not sensitive to the dielectric constant of formation when the dielectric constant of formation is less than the dielectric constant of oil (i.e. 5 in the model 600).

Figure 9:
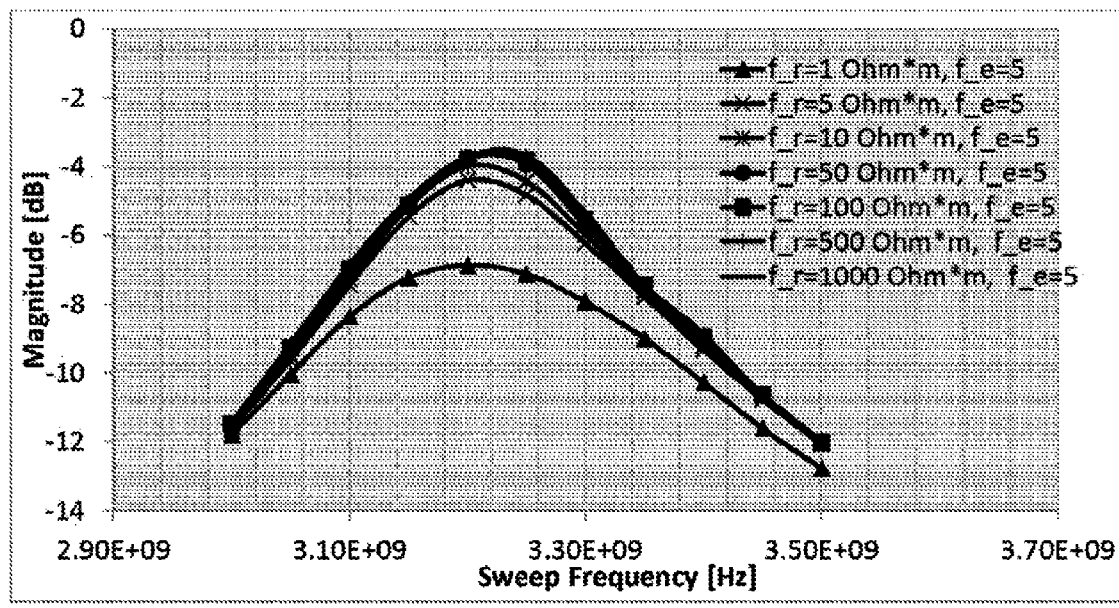
FIG. 9 illustrates a data diagram of S21 parameter versus sweeping frequency with different formation resistivities.
Figure 10A:
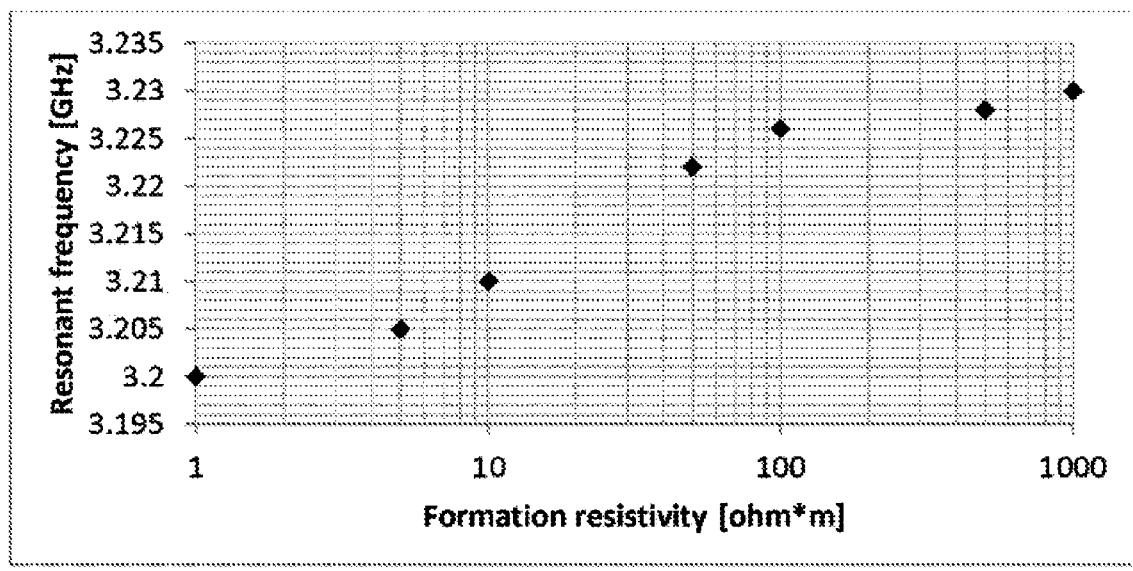
FIG. 10A illustrates a data diagram of resonant frequency versus formation resistivity.
Figure 10B:
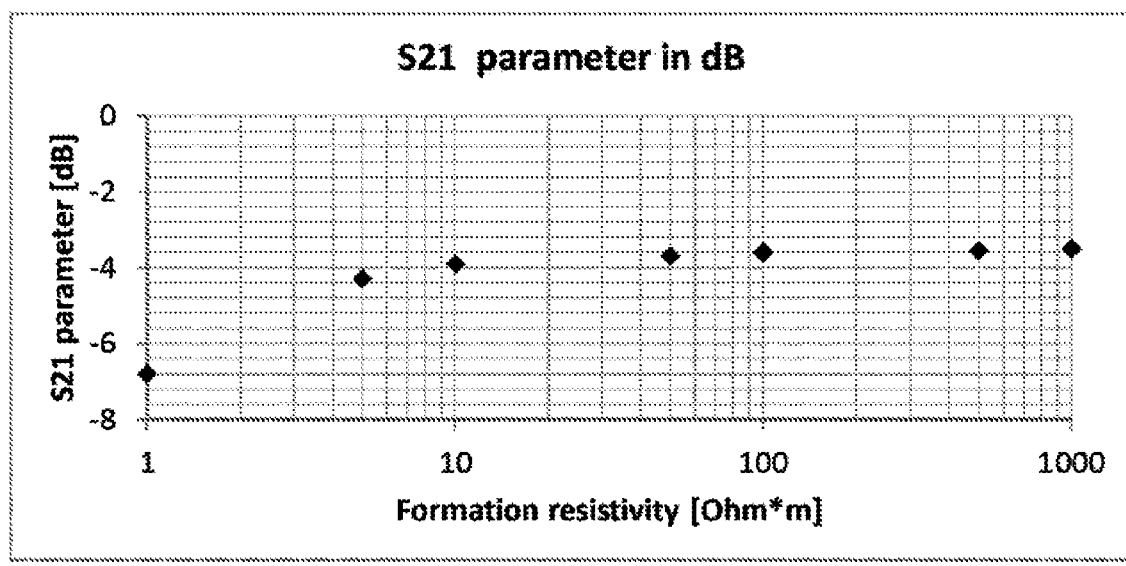
FIG. 10B illustrates a data diagram of S21 parameter versus formation resistivity.

FIG. 9 illustrates a data diagram of S21 parameter versus sweeping frequency with different formation resistivities (denoted as f_r in the FIG. 9) ranging from 1 to 1000 ohm*m and constant formation dielectric constant (denoted as f_e in the FIG. 7) of 5. It can be observed that the S21 parameters in dB at one port vary with sweeping frequencies at the other port. The changing of S21 parameter and resonant frequency with increase of resistivity can be better shown in FIGS. 10A and 10B. FIG. 10A illustrates a data diagram of resonant frequency versus formation resistivity and FIG. 10B illustrates a data diagram of S21 parameter versus formation resistivity. It can be seen that both resonant frequency and S21 parameter increase monotonically with increase of the resistivity of formation. In the model 600, the resonant frequency is sensitive to formation resistivity ranging from 1 to 1000 ohm*m. However, the S21 parameter is not sensitive to the formation resistivity when the formation resistivity is larger than 10 ohm*m.

FIGS. 7 to 10 show that the resonant frequency and S21 parameter are sensitive to the formation resistivity and dielectric constant and therefore can be used as indicators of electrical properties of surrounding formation. In some embodiments, a look-up table can be pre-built through forward modeling to be used to estimate the electrical properties based on the resonant frequency or the S21 parameter, or vice versa.

In some embodiments, a quality factor (Q-factor) of the resonator can be extracted from the FIGS. 7 and 9. The quality factor can be defined in terms of the ratio of the energy stored in the resonator to the energy dissipated, which is also a function of formation resistivity and dielectric constant, and therefore can be an indicator of formation electrical properties as well.

Figure 11:
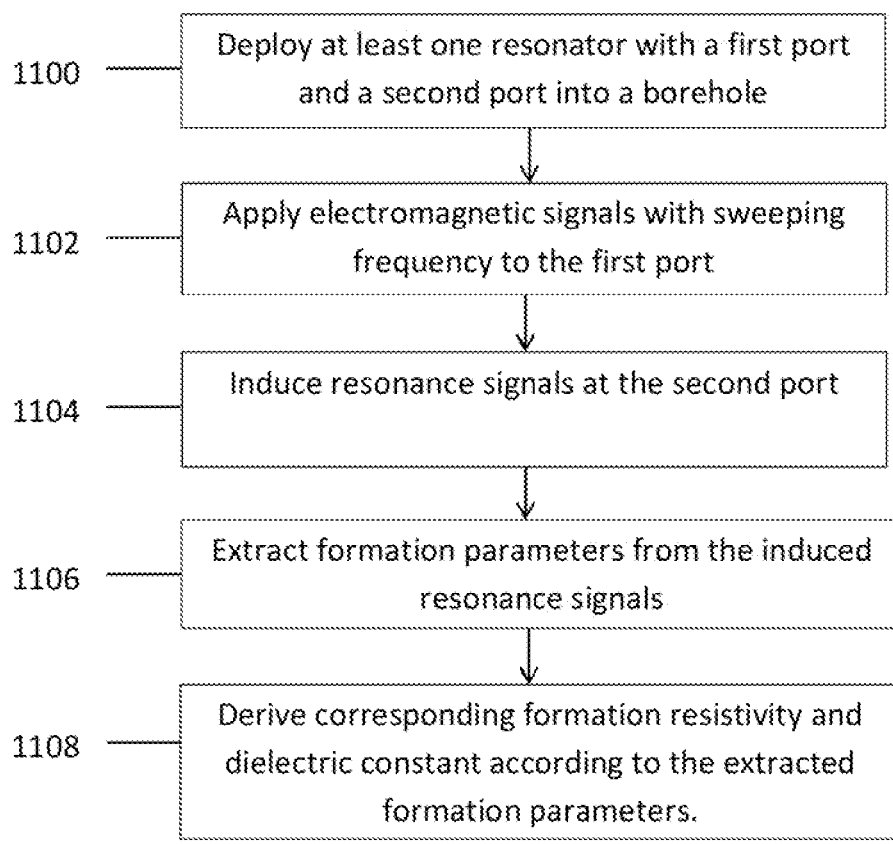
FIG. 11 illustrates a flow chart of a method for making oil-based mud imaging.

FIG. 11 illustrates a flow chart of a method for making oil-based mud imaging according to some embodiments of the present invention. The method can include deploying at least one resonator with a first port and a second port into a borehole 1100, applying electromagnetic signals with sweeping frequency to the first port 1102, inducing resonance signals at the second port 1104, extracting formation parameters from resonance signals 1106, and deriving corresponding formation resistivity and dielectric constant according to the extracted formation parameters 1108.

In some embodiments, the method for making oil-based mud imaging can further include the step of generating borehole images based on the derived formation resistivity and dielectric constant.

In some embodiments, the formation parameter can be a S21 parameter, a Q-factor, or a resonant frequency, or a combination of two or three of them.

In some embodiments, the step of deriving corresponding formation resistivity and dielectric constant according to the extracted formation parameters 1108 can include the step of looking up a pre-built table.

In some embodiments, the pre-built table can include any two of the three parameters: resonant frequency, S21 parameter, and Q-factor, and built through forward modeling.

The present invention is in no way limited to any particular step order shown in the flow chart.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An oil-based mud formation imaging tool for measuring electrical properties of surrounding formation comprising:
   a base plate;
   a first port and a second port deployed on the base plate;
   surface conductors covering both sides of the base plate; and
   inside conductors deployed in the first port and the second port and with gaps from the edges of the first and second ports;
   wherein the first port is fed with electromagnetic signals by a waveguide, causing a coupling to be formed between the imaging tool and the surrounding formation;
   wherein resonance signals are induced at the second port accordingly and used to compute corresponding formation resistivity and dielectric constant.

2. The oil-based mud formation imaging tool according to claim 1 wherein the inside conductor is the center wire of the waveguide.

3. The oil-based mud formation imaging tool according to claim 1 wherein the surface conductor is a ring conductor deployed on the surface of the base plate.

4. The oil-based mud formation imaging tool according to claim 1 wherein the exterior surface of the waveguide is grounded by contacting with the surface conductor covering one side of the base plate.

5. The oil-based mud formation imaging tool according to claim 1 wherein the base plate is made of dielectric materials.

6. The oil-based mud formation imaging tool according to claim 5 therein the dielectric materials have small dielectric loss.

7. The oil-based mud formation imaging tool according to claim 1 wherein the waveguide is a coaxial cable.

8. The oil-based mud formation imaging tool according to claim 1 wherein the electromagnetic signals have sweeping frequency.

9. The oil-based mud formation imaging tool according to claim 1 wherein the second port is coupled with a circuit to process induced resonance signals.

10. The oil-based mud formation imaging tool according to claim 1 wherein the gap between the inside conductor and the edge of the port creates an impedance in between, which varies with electrical properties of surrounding formation.

* * * * *